A. O. WILLCOX.
Stove.
No. 50,408. Patented Oct. 10, 1865.
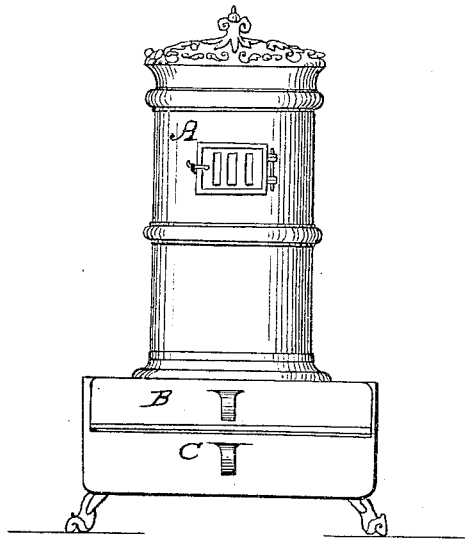
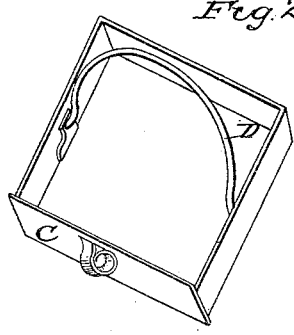 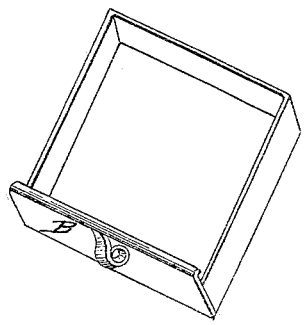

UNITED STATES PATENT OFFICE.

A. O. WILLCOX, OF PORT RICHMOND, NEW YORK.

IMPROVED STOVE.

Specification forming part of Letters Patent No. 50,408, dated October 10, 1865.

*To all whom it may concern:*

Be it known that I, A. O. WILLCOX, of Port Richmond, in the county of Richmond and State of New York, have invented a new and useful Improvement in Stoves; and I do hereby declare that the following is a full, clear, and exact description thereof, which will enable others skilled in the art to make and use the same, reference being had to the accompanying drawings, forming a part of this specification, in which—

Figure 1 is an elevation of the front of a stove containing my improvement. Figs. 2 and 3 are detailed views of the drawers B and C.

Similar letters of reference indicate like parts.

This improvement in stoves consists in providing a drawer beneath the ash-pan to receive a quantity of fresh coals, so as to dispense with a coal-hod and yet have coals at hand to renew the fire.

No provision has been made, except in magazine-stoves, to provide a place in or about a stove for parlor or other use where a supply of fresh coal or other fuel can be stored until needed. The supply of coal, therefore, which is provided to renew the fire is kept in coal-hods or other vessels in or near the apartment containing the stove. Magazine-stoves receive their supply of fuel in a part of the stove which is a continuation of the fire-chamber and communicates with it.

The object of my invention is to enable housekeepers and others to dispense with the necessity of keeping a coal-hod or similar vessel in or about their apartments for the purpose of having a supply of coal at hand, and I accomplish this object by adding below the usual or present bottom plate of a stove another bottom, or else guides which will support an additional pan or drawer, C.

The stove A here shown has its usual ash-pan, B, and below it I have shown the additional pan, C. Fig. 2 shows it detached from the stove. It is supplied with a bail, D, for convenience and facility in handling it, which is concealed in the pan when it is not raised for use.

The pan C is to be filled with coal and shoved into its place beneath the bottom of the stove and beneath the ash-pan B. This arrangement requires that the feet of the stove be taller than is now common, or that the sides of the lower part of the stove be extended as much lower as will equal the depth of the pan C.

The ash-pan B usually contains a body of ashes, and since they are not good conductors of heat and since the coal in the pan C will be separated from the burning fuel on the grate by this body of ashes and by that bottom of the stove on which the ash-pan rests, it is evident that the coal in said pan will not become heated so as to part with any of its gases.

Having thus described my invention, I claim as new and desire to secure by Letters Patent—

The combination, with a stove, of a pan or drawer for holding a supply of fuel, said pan being placed beneath the ash-pan, substantially as and for the purpose above set forth.

ALBERT O. WILLCOX.

Witnesses:
M. M. LIVINGSTON,
C. L. TOPLIFF.